United States Patent
Berrube et al.

(10) Patent No.: US 6,886,745 B2
(45) Date of Patent: May 3, 2005

(54) ELECTRONIC LABEL SYSTEM FOR DISPLAYING PRICES IN A SALE OUTLET

(75) Inventors: Francois Berrube, Courbevoie (FR); Pierre Legras, Strasbourg (FR)

(73) Assignee: Store Electronic Systems Technologies (FR)

( * ) Notice: Subject to any disclaimer, the term of this patent is extended or adjusted under 35 U.S.C. 154(b) by 228 days.

(21) Appl. No.: 10/149,684

(22) PCT Filed: Dec. 13, 2000

(86) PCT No.: PCT/FR00/03504

§ 371 (c)(1),
(2), (4) Date: Jun. 13, 2002

(87) PCT Pub. No.: WO01/44919

PCT Pub. Date: Jun. 21, 2001

(65) Prior Publication Data

US 2003/0001008 A1 Jan. 2, 2003

(30) Foreign Application Priority Data

Dec. 15, 1999 (FR) .......................................... 99 15813

(51) Int. Cl.[7] .............................................. G06K 15/00
(52) U.S. Cl. ...................... 235/383; 235/375; 235/376; 235/377; 235/378; 235/385; 705/20
(58) Field of Search ................................. 235/383, 375, 235/376, 377, 378; 345/187, 520; 705/20, 21

(56) References Cited

U.S. PATENT DOCUMENTS

| | | | | | |
|---|---|---|---|---|---|
| 5,172,314 A | * | 12/1992 | Poland et al. | ................... | 705/1 |
| 5,977,998 A | * | 11/1999 | Briechle et al. | ............ | 345/501 |
| 6,269,342 B1 | * | 7/2001 | Brick et al. | ................... | 705/20 |
| 6,445,370 B1 | * | 9/2002 | Goodwin, III | ............... | 345/87 |
| 6,546,435 B1 | * | 4/2003 | Yoshimura et al. | ............ | 710/4 |

FOREIGN PATENT DOCUMENTS

| | | |
|---|---|---|
| EP | 0 604 382 A2 | 6/1994 |
| EP | 0 837 411 A1 | 4/1998 |
| FR | 2 658 645 A1 | 8/1991 |
| WO | WO-99/26221 A1 | 5/1999 |

* cited by examiner

Primary Examiner—Steven S. Paik
(74) Attorney, Agent, or Firm—Lerner, David, Littenberg, Krumholz & Mentlik, LLP

(57) ABSTRACT

An electronic label system for displaying prices in stores comprises a central station and a plurality of distributed electronic labels. The central station provides pricing information to the electronic labels that includes assignment instructions linking a calculated price associated with the labels with a price display area.

22 Claims, 3 Drawing Sheets

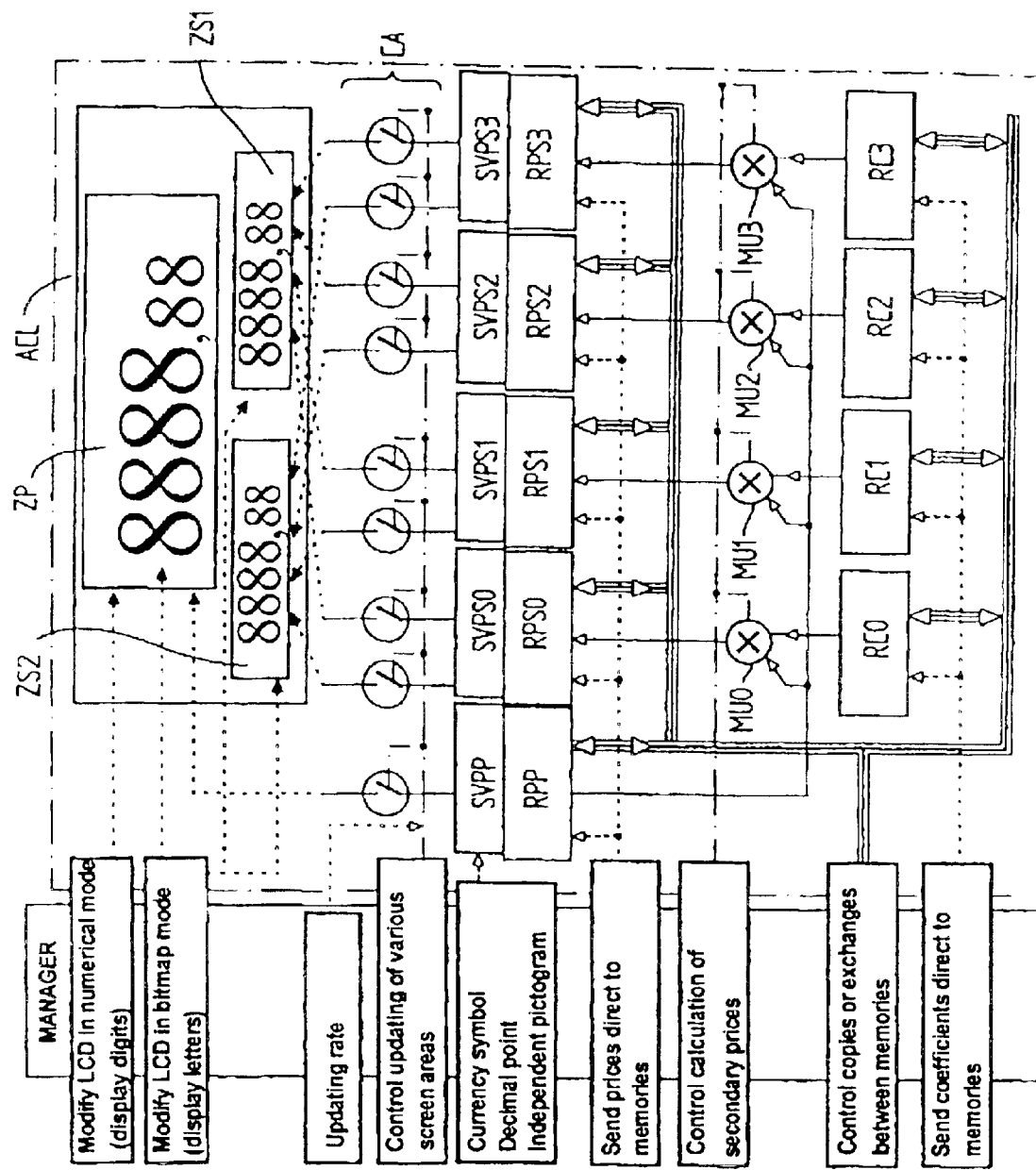
FIG_1

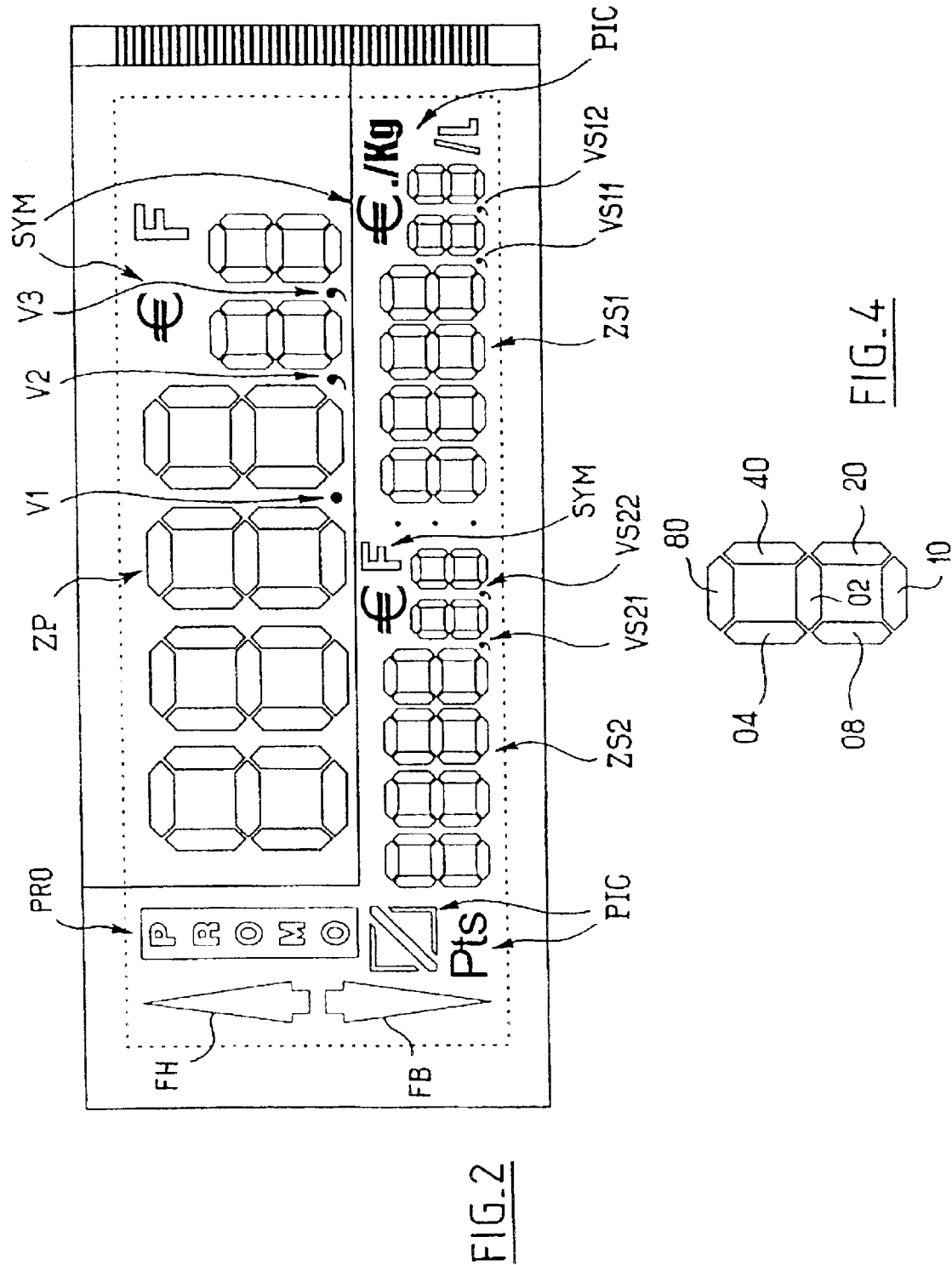

```
command logic tree
-8: - 15 backward count (used by buffer to activate label)
-7: personalize label, invariant command usable only in strong field mode
-1: characterize telegram: first part of address comprising at least the store code
   |-0: escape command no format, used for evolution
   |-4: send selling price, associated flags and general parameters
   |-5: send secondary price 0, associated flags and general parameters
   |-2: send coefficient or price, associated flags and general parameters
   |-3: - enter individual extended command
   |-6: - enter collective extended command
        |-8: address display, direct: display bit map
        |-9: time-delayed command (chainable command)
             |-0: test battery
             |-1: display address
             |-2: tempo
             |-3: economy
             |-4: change status
             |-5: complete address
             |-6: memory display
             |-7: turn on promo block
             |-8: turn off promo block
   |-A: - send coefficient or price, associated flags and general parameters
   |-B: get flag (chainable command)
        |-1: set arrows
        |-2: activate / deactivate promo block
        |-3: programme secondary price display timing
        |-4: delete and/or calculate and general display
        |-5: set reset on display general status
        |-8: display and calculation flag
        |-9..D: Price attribute decimal point currency and pictogram on designated price
   |-C: address display, direct: numerical display
   |-D: swap copy price (chainable command)
        |-0:..3 Swap
        |-4: change status
        |-6: turn off promo block
        |-7: turn on promo block
        |-8..B Copy
```

FIG.3

ELECTRONIC LABEL SYSTEM FOR DISPLAYING PRICES IN A SALE OUTLET

The present application is a U.S. National Phase Application under 35 U.S.C. §371 of PCT Application No. PCT/FR/00/03504 filed on Dec. 13, 2000, which claims the benefit of French Application No. 99/15813, filed on Dec. 15, 1999.

BACKGROUND OF THE INVENTION

The present invention relates generally to remote-controlled price display systems in stores.

On the shelves of a site such as a supermarket, hypermarket, or other retail outlet (for example pharmacies, etc.), an essential object of such systems is to present consumers with a price for each article on sale, with that price being known to correspond reliably to the price that appears in the central file of the store, i.e. with the actual price that will be charged for the article at the checkout.

Another object of those prior art systems is to enable price changes to be made automatically in much shorter times than with a manual display, whether this is for particular promotional periods in the store, for all or some of the articles, to implement price changes, to deal with inflation when prices have to be increased very frequently, etc.

Moreover, price display is subject to many constraints, in particular legal constraints, as to the nature of the prices displayed (unit price, promotional price, price in Euros, etc.), with which constraints electronic systems must conform in exactly the same way as displays on paper.

Accordingly, although electronic label systems are tending to become more and more sophisticated as time goes on, they nevertheless remain relatively rigid in terms of display facilities and the organization thereof over time.

The present invention aims to alleviate those drawbacks of the prior art and to propose an electronic label system that offers a vast range of display facilities, in particular to meet to the constraints referred to above and to satisfy an increasing demand from users to modify displayed prices often and for short periods, which system can act extremely flexibly and quickly to display information other than prices, for example information relating to the products and/or to the labels themselves, and which also offers the facility of modifying all the labels of a given group or all the labels throughout the store in accordance with precise time periods that are accurately specified in terms of when they begin and/or their duration.

BRIEF SUMMARY OF THE INVENTION

An object of the invention is to ensure that a label is returned to its initial state after the data displayed by the label has been modified temporarily.

To this end, a first aspect of the invention proposes an electronic label system, in particular for displaying prices in stores, the system comprising a central station and a plurality of distributed electronic labels, together with communication means, in particular wireless communication means, for sending information, in particular price information, from the central station to the labels, the system being characterized in that each label includes a set of price registers, a set of coefficient registers and a display including at least two price display areas, and the information sent from the central station to a label includes assignment instructions linking a calculated price equal to the price contained in one of the price registers multiplied by a given coefficient with a given price display area.

Preferred but non-limiting features of the above system comprise:

- the set of price registers comprises a main price register and one or more secondary price registers each adapted to contain a value equal to the main price multiplied by a coefficient contained in a coefficient register;
- the system includes a main price display area and one or more secondary price display areas;
- the system includes a plurality of secondary price registers and a plurality of secondary display areas, and the assignment instructions are adapted to make a choice from a predetermined set of assignments linking price registers and display areas;
- the number of secondary display areas is less than the number of secondary price registers;
- each price register is associated with a price attributes register and the contents of the two registers can be modified independently of each other;
- the information sent from the central station to a label further includes price transfer messages for a particular price register;
- each price transfer instruction is also able to contain a calculation or display parameter;
- the information sent from the central station to a label further includes coefficient transfer messages for a particular coefficient register;
- the information sent from the central station to a label further includes instructions for directly addressing segments of the price display areas forming characters in order to display information comprising alphanumeric and other signs;
- each segment of a character is assigned a numerical value, the numerical values assigned to the various segments are such that there is a one-to-one relationship between a sum of said values and the values contributing to that sum and designating the segments to be displayed, and the instructions for directly addressing the segments include a respective sum associated with each character;
- the information sent from the central station to a label further includes instructions for permutating the contents of two price registers or two coefficient registers;
- the information sent from the central station to a label further includes instructions for copying the content of a price or coefficient register to another price or coefficient register; and
- the permutation and copying instructions consist of a single instruction containing a command code, two register addresses and a parameter indicating permutation or copying.

A second aspect of the invention proposes an electronic label system, in particular for displaying prices in stores, comprising a central station and a plurality of distributed electronic labels, together with communication means, in particular wireless communication means, for sending information, in particular price information, from the central station to the labels, the system being characterized in that each label includes a memory, a display and means for controlling display on the basis of information contained in said memory, and the information sent from the central station to a label is contained in a single message, which message includes instructions containing data assigning the content of a particular memory area to a particular display area of the display and is adapted to contain time-delay data from which the label determines a timing parameter relating to said assignment.

Preferred but non-limiting features of the above system comprise:

- the display of each label comprises a plurality of price display areas, the memory of each label includes a plurality of price memory areas, and said instructions includes instructions for assigning a particular set of price memory areas to said display areas;
- said timing parameter is a duration for which the assignment must be applied;
- said timing parameter is a delayed time from which the assignment must be applied;
- each label includes means for verifying the status of a power supply battery of the label and said particular memory area contains a battery status indicator;
- said particular memory area is an address area of the label;
- the system includes means for selectively loading a long address or a short address into an address memory of an electronic label; and
- the long address consists at least in part of the characters of a standardized product code of a product associated with the label and the short address consists at least in part of a particular portion of the characters of said product code and other characters.

BRIEF DESCRIPTION OF THE DRAWINGS

Other aspects, objects and advantages of the present invention become more apparent on reading the following detailed description of a preferred embodiment of the invention, which is given by way of non-limiting example and with reference to the accompanying drawings, in which:

FIG. 1 is a block diagram of some functions of an electronic price display label in accordance with the invention;

FIG. 2 is a front view of a preferred embodiment of a liquid crystal display used in an electronic label of the invention;

FIG. 3 is a list of commands used in messages sent to the electronic labels, and FIG. 4 shows a particular numerical coding of a seven-segment display.

Before starting the description proper, it should be noted that, in the following description, the terms register, memory and memory area are used interchangeably to designate the locations in the electronic label for variable information, whether that information consists of data, parameters, commands, etc. Also, the term digit is to be generally understood as referring to a group of four bits (a quad), although this is in no way limiting on the invention, of course.

DETAILED DESCRIPTION OF THE INVENTION

General Architecture

Overall Structure

Note first of all that the electronic labels of the system of the invention have a general architecture primarily comprising:

- a control microcontroller, associated with an operating system contained in a read-only memory and with appropriate dedicated integrated circuits;
- a set of memories or registers for variables (price, label address, various flags, etc.);
- a circuit for receiving signals sent by a central station or a portable unit, associated with a receive antenna (radio transmission) or a photosensitive element (infrared transmission), for example;
- a control circuit that controls price display in particular on the basis of the content of the memories;
- a battery power supply for various circuits; and
- a casing.

For more details on a label of the above kind, and in particular on how it communicates with a central station and portable terminals, see for example the document FR 2 658 645 A in the name of the Applicant.

Referring to FIG. 1, there is shown a portion of the architecture of an electronic label which includes a liquid crystal display ACL having a main price display area ZP and two secondary price display areas ZS1 and ZS2, which in this example are smaller than the main area.

The label has five price registers, namely a main price register RPP and four secondary price registers RPS1, RPS2, RPS3 and RPS4.

Four coefficient registers RC1, RC2, RC3 and RC4 are associated with the four secondary price registers.

The label controls operations that multiply the content of the main price register RPP by the contents of the coefficient registers RC1 to RC4 by means of four multipliers MU0 to MU3 which are in practice implemented in the operating system of the microcontroller.

The label is also able to control the assignment of the various price registers to the three display areas, using display commands CA symbolized shown in FIG. 1 as switches. Note that the main price memory RPP can be assigned only to the main area ZP of the display whereas each secondary price memory RPS0 to RPS3 can be assigned to either of the two secondary areas ZS1 and ZS2 of the display.

Note also in FIG. 1 that the price data in the registers is associated with decimal point position, currency symbol and pictogram data stored separately in respective areas SVPP and SVPS0 to SVPS3, for reasons explained later.

The left-hand part of FIG. 1 shows diagrammatically a number of actions on the label, initiated by messages from the central station, and dashed or dotted lines designate corresponding actions in the block diagram on the right-hand side of the figure.

Display

FIG. 2 shows in more detail the organization of the liquid crystal display ACL, with:

- the main price area ZP, offering two decimal point position options V1 and V2,
- the two secondary price areas ZS1 and ZS2, each offering two decimal point position options, respectively VS11, VS12 and VS21, VS22;
- an upward arrow FH and a downward arrow FB for indicating where to find the product on sale corresponding to the label;
- currency symbols SYM;
- pictograms PIC; and
- a promotion block PRO, indicating that the article is currently on sale at a promotional price.

As explained in more detail hereinafter, the display can show either price data and other information supplied by the various registers of the label or bit map or like mode semi-graphical data from a central station.

Activating a Label

A label is activated in accordance with the following protocol: after correct reception of a normal activation command, the label sets a time-delay of approximately 36 seconds. At the end of this time-delay, the label tests for the presence of a weak field radio transmission. This test is then repeated, approximately every 37 seconds.

A special command for chaining commands is also provided, which executes a weak field reception test much faster, typically less than one second after processing the command. This enables some commands to be chained (see the description of the commands later), and economizes the time period of 72 seconds needed for synchronization in the event of additional commands. This special command is naturally usable only when addressing a single command individually to one label or to the whole of the installed base of labels.

Moreover, this command chaining function is valid only for some of the commands described later, including:

a set flag command B;

a change label address command E;

and also for the following commands, if the automatic display on reception function (see below) is deactivated:

a send coefficient and price command 2;

a send main price command 4;

a send secondary price command 5;

a send price and coefficient command A; and a permutate or memory-to-memory copy command D.

Detailed Description of the System

The organization of the various items of information in the label and the various commands that can be received, mainly from the central station (server) of the store, is described in more detail next.

1) Content and Processing of Memories a) Prices and Coefficients and Associated Calculations The label has nine memory areas or registers, namely:

a main price area (six digits+decimal points+currency symbols);

four secondary price areas (six digits+decimal points+currency symbols+pictograms); and four coefficient areas (six mantissa digits+one exponent digit).

Each main or secondary price memory area is associated with:

one of three decimal point positions; and one of three currency symbols.

Each secondary price memory area is associated with:

one or more (from zero to four) pictograms; and a coefficient (six digits+an exponent digit).

The dedication of the memories is defined as follows:

RPP: memory address 1: main price,

RPS0: memory address 2: secondary price 0,

RPS1: memory address 3: secondary price 1,

RPS2: memory address 4: secondary price 2,

RPS3: memory address 5: secondary price 3,

RC0: memory address A: coefficient 0 (can be associated with secondary price 0), RC1: memory address B: coefficient 0 (can be associated with secondary price 1), RC2: memory address C: coefficient 0 (can be associated with secondary price 2), RC3: memory address D: coefficient 0 (can be associated with secondary price 3).

The content of the main price memory RPP is always displayed in the main price area ZP of the display.

The contents of the secondary price memories can be displayed cyclically in the secondary price areas ZS1 and ZS2 of the display, see below.

Note that the communication protocol enables contents to be downloaded directly from the central station to all the memories, including the secondary price memories. However, as explained in more detail later, such downloading of the secondary price memories makes sense only if multiplication is disabled beforehand.

Afterwards, as soon as multiplication is activated, the secondary prices are calculated by multiplying the main price by a coefficient and the associated secondary price memory receives the result of the multiplication.

The coefficients are downloaded into the coefficient memories in the form of an exponent followed by the most significant digit of the mantissa, which must not be zero.

When a price is sent, the status of the promotion block PROMO of the display can be modified by inserting before the price either a digit of value A or a digit of value B (the values are in hexadecimal in this example). The value A turns off the promotion block while the value B causes it to blink on and off.

The content of a coefficient memory is not necessarily intended for the multiplication calculation described above, in which case There is no restriction on the format of this content.

On this subject, to prevent pricing errors that might be caused by unintentional multiplication of the main price value by the content of a coefficient memory if that content is not a coefficient, the central station can verify the plausibility of the result of the multiplication, and in particular can verify that the result of the multiplication is less than or equal to 999999 (in the case of a six-digit display).

Note that multiplying the main price by a coefficient consists in multiplying together two initial items of data, each on six digits, plus the exponent.

The complete result is therefore on thirteen digits plus the exponent, and is rounded to six digits employing the usual conventions employed for the Euro (whereby a value of 0.4 is rounded down to 0 whereas a value of 0.5 is rounded up to 1).

b) Flags and Parameters

The memory of the label has a number of locations for flags and parameters for modifying and adapting the operation of the label.

The flags and parameters include:

a general display status flag, coded on four bits (one quad):

the bit of weight 0 is a command for automatic display on receiving a price: if this bit is at 1, the secondary prices are recalculated on receiving a main price or a coefficient and the recalculated prices are displayed; on the other hand, if this bit is at 0, the display is not changed, the calculations are not done again, and the price or coefficient received is simply stored in the corresponding memory area.

the bit of weight 1 is a command to blink the display on and off: if this bit is at 1, the display blinks on and off; otherwise the display is fixed.

the bit of weight 2 is a command for cyclic display of secondary prices; if this bit is at 1, the secondary prices are displayed in the secondary display areas with a predefined rhythm.

the bit of weight 3 is a main price display command, authorizing or prohibiting display of the main price, according to its value.

flags authorizing calculation of secondary prices;

flags authorizing display of secondary prices in display area ZS1;

flags authorizing display of secondary prices in display area ZS2.

(The above authorization flags, which have a length of four bits, are coded in the following manner:
    bit of weight 0: secondary price 0;
    bit of weight 1: secondary price 1;
    bit of weight 2: secondary price 2;
    bit of weight 3: secondary price 3.)
  a secondary area display timing parameter on four bits, for example with the following four (decimal) values, which can vary from less than one second to several seconds, for example:
    2: fast timing;
    6: standard timing;
    9: slow timing;
    15: very slow timing.
  a promotion block status parameter on one bit (1=blinking on and off; 0=off).
  a timing-delay parameter: some commands (in particular commands 8, 9 and C, see below) can be associated with a time-delay to limit the time for which the action initiated by the command continues. For example, it is possible to specify that the label can recalculate all the secondary prices and then display the new prices only after the expiry of a time-delay associated with a new main price transfer command. Other commands with a time-delay can be used to display service information and short-term messages contained in specific memory areas.

Another function associated with commands with a time-delay can shorten a time-delay already in progress, for example by sending the label a message containing a new time-delay less than the original one, possibly a zero time-delay, or by sending the label an immediate display command, or any appropriate instruction.

It is important to note here that the label can be designed so that if it is receiving a message that is not intended for it extends the time-delay by a time equal to the time taken to receive it.

Furthermore, it is advantageous if reception by the label of a command that is intended for it cancels the time-delay.

The time-delay parameter (tempo) can be coded on four bits (sixteen hexadecimal values), for example, providing fourteen different time-delays, for example, in arithmetical, geometrical or other progression and varying from a few seconds to 24 hours or more.

Note that the effective duration of the time-delay is equal to the value fixed by time-delay parameter (tempo) plus the time taken to receive it.

2) Commands
a) Command Logic Tree

FIG. 3 of the drawings shows in the form of a tree one example of a set of commands used in an electronic label system according to the invention.

Note that there can be redundancy between some commands, and in particular:
  transfer of prices and/or coefficients by commands 2, 3 and 6;
  activation/deactivation of the promotion block by the commands 2, 3, 4, 5 and 6; and
  transfer of flags and general parameters by the commands 2, 3, 4, 5 and 6.

b) Detailed Description of Commands

Some of the commands shown in FIG. 3 are described in detail next.

Command 7—Customize Label

Note first of all that a command of this kind can be sent only in the strong field mode (i.e. by communication with a portable terminal).

The hexadecimal code for the command is 7.

This command conveys two sets of parameters, namely:
  general display flags (four-bit word, see above); and
  a parameter with N bits, which defines the status of N product designation arrows associated with the label: for each bit, the value O turns on the corresponding arrow and the value I turns it off.

Also, this command is used to set the address of the label by overwriting the preceding address, in particular if the label must be associated with a different product on the shelf. The format of this address is a word with 13 digits, corresponding to the value of the standardized EAN13 code of the associated product, for example.

(Note on Addressing

In the system according to the invention, a label can be addressed using a long address or a short address.

The long address of the label comprises 13 digits, for example the 13 digits of the standardized EAN13 code of the associated product, preceded by three digits constituting a store code, that is to say 16 digits in total.

The short address comprises only nine digits, namely, in order of decreasing weight:
  three digits (preferably the three digits of the store code), and
  an address on six digits, of which the four least significant digits can be the four least significant digits of the EAN13 code.

In short addressing mode, it is these six digits which are used to address the individual labels.

The change from a long address to a short address is effected as follows: the address sent to the label by the command 7 is a long address, and if at least one of the six most significant digits of the 13-digit address is greater than nine (hexadecimal), then the label goes automatically to the short address mode.)

Note also that, at the time of a command 7, the label displays the last four digits of the address temporarily, for example in the main area, so that they can be verified by comparing them to the last four digits of the EAN13 code on the product.

Command 1—Characterize

This kind of command provides an introduction to other commands, and designates a group of labels intended to process subsequent commands.

A command 1 contains at least the store code, in which case it designates all the labels in the store.

It contains at most the store code plus the first 12 digits of the long address, in which case the label group it designates comprises all the labels whose first 12 address digits match those appearing in the command.

Naturally, for designating larger or smaller groups of labels, any number of address digits from 0 to 12 can be envisaged.

Command 0—Escape

This is a command whose format is indeterminate and totally free and which contains the address of a label. After receiving its address, the label ignores the remainder of the command. This command is reserved for future development.

Command 4—Send Main Price

This complete command includes a label address and a main price intended for that label, consisting of six digits followed by the position of the decimal point and a currency symbol code.

The price information can be followed by a number of display and calculation flags and parameters, as described above:

the status of the promotion block;
prices displayed in the secondary display area ZS1;
calculated prices;
the general status of the display;
prices displayed in the secondary display area ZS2.

All the information previously contained in the memory of the label and to which the content of a command 4 message does not relate is retained. For example, it is possible to send only some of the price, decimal point position and currency symbol code digits, the others remaining unchanged.

Command 5—Send Secondary Price 0 (Register RPS0)

The rules are the same as for the command 4 (send main price), except that the price is followed by a digit indicating a pictogram or pictograms to be associated with secondary price 0.

The status of the promotion block can be modified quickly by inserting the command before the price itself.

Command 2—Send a Coefficient or a Price

Prices have the format indicated above (six digits, decimal point position and currency symbol).

The coefficients are multiplier coefficients with six mantissa digits, and are always associated with an exponent.

For example, an exponent value equal to 8 (hexadecimal) corresponds to $10^0$, a value equal to 9 corresponds to $10^1$, and so on; conversely a value equal to 7 corresponds to $10^{-1}$, and so on.

The command further includes a digit designating the address in the label of the price or the coefficient sent, namely (see above) an address 1 for the main price, an address from 2 to 5 for one of the four secondary prices, and an address from A to D for one of the four coefficients.

Once again, non-significant zeros are not necessarily sent.

Display and calculation parameters and flags can be sent, in the same way as for the commands 4 and 5 described above, and the same applies to fast access to the promotion block.

Command 3—Enter Individual Extended Command

This kind of command contains an individual label address and an extended command code, followed by parameters and the body of the command itself.

This command is reserved for implementing special functions in a given label by means of subcommands (see below).

Command 6—Enter Collective Extended Command

This command is collective in the sense that it does not include an individual label address, and the group of labels to which it relates is a group of labels designated by a command 1 (characterize) message sent previously.

The first digit of the command is the digit 6 and is followed by an extended command code, which is in turn followed by parameters constituting the body of the extended command.

The command 6 enables a given group of labels to implement some functions.

The various extended commands that can be included in commands 3 and 6 are described next.

Command 8—Address Display, Direct (Bit Map)

Each display symbol comprises seven segments, some combinations of which can define letters or symbols other than those normally displayed by a conventional 7-segment coder.

In the present example, the seven segments are assigned respective pairs of hexadecimal values: 02, 04, 08, 10, 20, 40, 80, as shown in FIG. 4 of the drawings.

To each combination of segments turned on that forms a letter or a symbol there corresponds an unique sum of values assigned to those segments, and vice versa, as shown by the following table, which is provided merely by way of example (the calculations are in hexadecimal):

| Letter or symbol | sum |
|---|---|
| I | 40 + 20 = 60 |
| t | 10 + 8 + 4 + 2 = 1E |
| - | 02 = 02 |
| H | 40 + 20 + 8 + 4 + 2 = 6E |
| F | 80 + 8 + 4 + 2 = 8E |
| y | 40 + 20 + 10 + 4 + 2 = 76 |
| L | 10 + 8 + 4 = 1C |
| U | 40 + 20 + 10 + 8 + 4 = 7C |
| J | 40 + 20 + 10 = 70 |

The command 8 contains a set of sum values designating the required symbols for the N digits of the display, together with a time-delay digit representing the time period for which these symbols are to be displayed, with values that can vary in steps from a few seconds to several tens of hours for example (see above).

It also contains a number of digits and/or bits constituting display parameters, for example:

a digit:
  whose two least significant bits designate the area ZP, ZS1 or ZS2 of the display that is to display the received symbols;
  whose next bit indicates if the symbols and/or pictograms currently displayed in the designated area must be cleared or not when displaying the symbols; and, finally
  whose most significant bit indicates if the label must first clear all of the designated display area.
another digit that designates the location within the designated display area at which the display of the symbols must begin, using the following convention, for example:

0: at the first digit (the leftmost digit)
2: at the second digit
4: at the third digit
6: at the fourth digit
8: at the fifth digit
A: at the sixth digit It is advantageous if only the symbols that can actually be displayed, given the value of the last digit, are sent in a command 8 message.

Command C—Address Display, Coded Direct

This command, for turning on certain alphanumeric or other signs on the displays, is identical to command 8 except that the data is numerical and not in the form of a segment map, as described. Thus a quad can cause display of digits, letters and symbols, for example in accordance with the following table:

| Value | Display |
|---|---|
| 0 | 0 or O |
| 1 | 1 or I |
| 2 | 2 |
| 3 | 3 |
| 4 | 4 |
| 5 | 5 or S |
| 6 | 6 or G |
| 7 | 7 |
| 8 | 8 |

-continued

| Value | Display |
|-------|---------|
| 9 | 9 |
| A | empty |
| B | F |
| C | = |
| D | t |
| E | U |
| F | C |

Command A—Send Coefficients or Prices, Associated Flags and General Parameters

This command is similar to command 2, using the same functions and the same format.

Its benefit is that it can be associated with command 6 and thereby address given groups of labels or even all of the labels of the same store.

In the case of sending a price, fast control of the promotion block, as described above, is also available with this command.

Command D—Permutate or Copy Prices

This command comprises blocks of three digits which can be linked to constitute a macrocommand.

It contains, after the code D of the command, series of digits constituting the blocks of commands.

The most significant bit of the first digit of each block indicates whether a price must be copied or permutated. The three least significant bits indicate the number of digits of the price to which the copying or permutation applies.

For example, a value 0 for these bits (000) indicates that it concerns the first 6 digits, while the values 1, 2 and 3 (respectively 001, 010 and 011) respectively correspond to 7, 8 and 9 digits.

There are a number of exceptions to this:
first exception (if the first digit of each block has the value 4, i.e. 0100): this enables the display and calculation flags to be modified, the value 4 introducing a subcommand chosen from the following subcommands, for example:
followed by prices displayed on secondary display ZS1;
followed by calculated prices;
followed by general display status;
followed by prices displayed on secondary display ZS2;
second exception (if the first digit of each block has the value 6, i.e. 0110): this turns off the promotion block, by means of single-digit command;
third exception (if the first digit of each block has the value 7, i.e. 0111): this turns on the promotion block, also by means of a single-digit command.

The second digit designates a block of the source of the copy or permutation and the third digit designates its destination, the (hexadecimal) values of these digits being the addresses of the memories, from 1 to 5 for prices and from A to D for coefficients (see above).

For example, the block with the value 01A designates a permutation between the value in the main price register and the value of the mantissa in the coefficient 0 register, and the block with the value 814 designates copying of the content of the main price register to secondary price register 2.

Command B—Set Flag

This command can be chained, in the sense that it can comprise a succession of command blocks. These blocks can be linked to constitute a macrocommand.

The digits that follow the command code B constitute the blocks of commands whose first digit indicates the subcommand to be executed and whose subsequent digit(s) designate(s) the execution mode. In this example the available subcommand values are:

1: send a set arrow command (see above on the subject of flags and parameters);

2: send a promotion block command (blinking on/off or off);

3: send a secondary price display timing command (see above);

4: send a clear display and/or general calculation and display command (see above);

5: set/reset general status command: the next digit (second digit) is ANDed with the status digit (reset flag) and the third digit is ORed with the same status digit (set flag).

The values of the above flags are as follows:

bit 0: display automatically on receiving command;
bit 1: blink display on/off;
bit 2: activate cyclic display of secondary prices;
bit 3: activate display of main price.

Note that resetting the flags produces a digit equal to 1101, i.e. D in hexadecimal.

8: modify display and calculation flags command: the second digit of the block designates the subcommand to be executed, and in particular:

followed by prices displayed on secondary display ZS1;
followed by calculated prices;
followed by general display status;
followed by prices displayed on secondary display ZS2.

9: modify main price attributes command: the subcommand code 9 is followed by a digit representing the number of digits after the decimal point and the currency symbol associated with the main price, or a promotion block command digit.

A, B, C and D : modify attributes of respective secondary price command (i.e. commands 0, 1, 2 and 3): these subcommands are analogous to subcommand 9, except that the promotion block command is replaced by the command for the pictogram or pictograms associated with the secondary price concerned.

On the subject of the format of the decimal point position and associated pictogram flags, the following convention can be adopted, for example: the two least significant bits of the quad indicate the number of digits after the decimal point in the display (four values, specifying a number of digits after the decimal point from zero to three); the two most significant bits of the same quad code the currency symbol to be used, for example with the following convention:

00: no currency symbol;
01: first currency symbol (e.g. the local currency);
10: second currency symbol;
11: third currency symbol.

Note that these are only display rules, the label working only on anonymous integer numbers. Note also that the currency symbols can be highly diverse, depending on the country in which the system is used (local main currency, local secondary currency, Euros, or any other useful currency).

The pictograms associated with the secondary prices are coded in the four bits of the next digit, to selectively turn on or off four different pictograms.

Command 9—Time-delayed Command

This command can be chained, in the present example with nine types of time-delay command with the following format: the first digit in all cases designates the duration of the time-delay, as in command 8 (see above).

The processing of a command 9 in the label consists in executing the command, and then starting the time-delay indicated by the first digit. When the time-delay expires, cyclic display of the secondary prices is activated, while the commands for calculating the secondary prices and displaying the main price are executed if the authorization parameters allow this (see above).

Also, independently of the value of the flag concerned, the label automatically displays the data received as soon as it is received.

Note that, during the time-delay, the label continues to be able to receive other commands sent by the central station (weak field) or a portable terminal (strong field).

A command 9 is organized into sub-blocks of variable size. The first digit of each sub-block indicates the action to be effected and its second digit indicates the area of the display concerned, where applicable, using the following convention:

1: main area;
2: first secondary price area;
3: second secondary price area.

The third digit of the sub-block indicates, where applicable, the memory area whose content must be displayed, preferably using the conventions explained above, namely 1 to 5 to display one of the five prices and A to D to display one of the four coefficients.

The nine types of subcommands of a time-delayed command are as follows:

0: test label stack (command on 2 digits): the result is the display of YES on the designated display, for the duration of the time-delay, if the label has verified that the battery is still sufficiently charged. If the battery is spent, the information bAtt is displayed. The YES and bAtt displays can blink on/off: note that this battery test also tests correct operation of the receive and other circuits of the label: accordingly, if this kind of sub-command does not provoke the above behavior, then the observer knows that the label is defective.

1: display label address (command on 2 digits): this command causes the display of the last four digits of the address (identical to the last four digits of the EAN13 product code, for example) on the designated display and for the time period fixed by the time-delay. These four digits are preferably followed by -C to indicate that they constitute a product code.

2: start defined time-delay (command on 1 digit): this command has no effect during the time-delay; when the time-delay expires, the display is merely refreshed or updated (as for the other time-delayed commands). Thus the time at which price changes previously loaded into a label actually appear on the display can be chosen.

3: power save (command on 1 digit, not chainable): this command turns off the display throughout the time-delay, in particular to economize on the battery.

4: change status of display and start time-delay (command on 5 digits): the first digit contains the command code 4; the second digit designates the price to be displayed in the second area ZS1; the third digit designates the calculated price; the fourth digit is used to modify the display status, in accordance with the rules defined above; finally, the fifth digit designates the price that must be displayed in the second area ZS2.

5: scroll label address (command on 1 digit, not chainable): the last four digits of the address are displayed in the main area ZP of the display and the 13 digits of the individual address of the label (excluding the store code) are shown on the secondary display ZS1, scrolling horizontally from left to right.

Note that, in the case of command 5, the digit normally used for the time-delay advantageously indicates the number of horizontal scanning steps to be effected.

6: display content of memory (command on 3 digits): the two least significant bits of the second digit designate the display concerned and the third digit designates the memory area whose content is to be displayed.

Note that the bit immediately preceding the two least significant bits can advantageously be used for selectively deleting the decimal point, the currency symbol and the pictograms or pictograms associated with the display concerned.

7: start blinking promotion block on/off (command on 1 digit): the command is executed as soon as it is received and it is a feature of this command that blinking continues when the time-delay expires.

8: stop blinking promotion block on/off (command on 1 digit): the promotion block is turned off as soon as the command is received, and remains turned off even after the time-delay expires.

A number of concrete examples of using the system described above will now be described:

i) a label can display, in an extremely flexible manner, and in particular as a function of the requirements of the user or of time, highly diverse prices such as current price, promotional price, old price (especially while the promotional price applies), price per liter or per kilo, price in one or more other currencies (in particular in Euros for countries adopting the single European currency), etc.

ii) when a label has been sent a new main price, the label can automatically calculate and display secondary prices, such as the price in Euros or some other currency and the price per liter or per kilo.

iii) a promotional price, or any other new price, can be stored in all the labels in advance, by means of a single collective command to update the display for a group of labels or for all the labels in the store, so that the labels can be switched to the new prices extremely quickly.

iv) in the same manner, the switching of prices at the time of a change of currency, such as the legal changeover from prices in a local currency to prices in Euros, can be prepared in advance and effected very quickly.

v) display of management data (quantity in stock, number of facings, consumer unit, restocking unit, etc.) can be instigated from the central station, with a time-delay if necessary, to ensure that the label reverts to its original status at the end of a particular time period.

vi) the last four digits of the label address (EAN13 code) can be displayed to verify the correct assignment of the label to the product, also with a time-delay if necessary.

vii) tests can be carried out, in particular a battery status test, and the results shown on the display, with the assurance that the label will resume its original status thanks to the time-delay.

Of course, the present invention is in no way limited to the embodiment described hereinabove and shown in the drawings, many variations of or modifications to which will be evident to the person skilled in the art.

In this regard, note that although the essential content of the various commands has been described in detail hereinabove, to facilitate interpreting them, and to make processing reliable, they can include various separators of different lengths, along with bits or digits for checksum or other type error checking functions.

What is claimed is:

1. An electronic label system, in particular for displaying prices in stores, the system comprising a central station and a plurality of distributed electronic labels, together with communication means, in particular wireless communication means, for sending information, in particular price information, from the central station to the labels, wherein each label includes a set of price registers, a set of coefficient registers, a multiplying circuit, and a display including at least two price display areas, and wherein the information sent from the central station to a label includes assignment instructions linking a calculated price equal to the price contained in one of the price registers multiplied by a given coefficient in said multiplying circuit with a given price display area.

2. A system according to claim 1, wherein the set of price registers comprise a main price register and one or more secondary price registers each adapted to contain a value equal to the main price multiplied by a coefficient contained in a coefficient register.

3. A system according to claim 2, further comprising a main price display area and one or more secondary price display areas.

4. A system according to claim 3, further comprising a plurality of secondary price registers and a plurality of secondary display areas, and wherein the assignment instructions are adapted to make a choice from a predetermined set of assignments linking price registers and display areas.

5. A system according to claim 4, wherein the number of secondary display areas is less than the number of secondary price registers.

6. A system according to claim 1, wherein each price register is associated with a price attributes register and the contents of the two registers can be modified independently of each other.

7. A system according to claim 1, wherein the information sent from the central station to a label further includes price transfer messages for a particular price register.

8. A system according to claim 7, wherein each price transfer instruction further includes a calculation or display parameter.

9. A system according to claim 1, wherein the information sent from the central station to a label further includes coefficient transfer messages for a particular coefficient register.

10. A system according to claim 1, wherein the information sent from the central station to a label further includes instructions for directly addressing segments of the price display areas forming characters in order to display information comprising alphanumeric and other signs.

11. A system according to claim 10, wherein each segment of a character is assigned a numerical value, the numerical values assigned to the various segments are such that there is a one-to-one relationship between a sum of said values and the values contributing to that sum and designating the segments to be displayed, and the instructions for directly addressing the segments include a respective sum associated with each character.

12. A system according to claim 1, characterized in that the information sent from the central station to a label further includes instructions for permutating the contents of two price registers or two coefficient registers.

13. A system according to claim 1, wherein the information sent from the central station to a label further includes instructions for copying the content of a price or coefficient register to another price or coefficient register.

14. A system according to claim 12 or claim 13, wherein the permutation and copying instructions consist of a single instruction containing a command code, two register addresses and a parameter indicating permutation or copying.

15. A system according to claim 1, wherein the system further includes means for selectively loading a long address or a short address into an address memory of an electronic label.

16. A system according to claim 15, wherein the long address comprises at least a part of the characters of a standardized product code of a product associated with the label and the short address consists at least a part of a particular portion of the characters of said product code and other characters.

17. An electronic label system, in particular for displaying prices in stores, comprising a central station and a plurality of distributed electronic labels, together with communication means, in particular wireless communication means, for sending information, in particular price information, from the central station to the labels, wherein each label includes a memory, a display and means for controlling the display on the basis of information contained in said memory, and wherein the information sent from the central station to a label is contained in a single message, the message including instructions containing data assigning the content of a particular memory area to a particular display area of the display and time delay data from which the label determines a delayed time from which the assignment is applied.

18. A system according to claim 17, wherein the display of each label comprises a plurality of price display areas, the memory of each label includes a plurality of price memory areas, and said instructions includes instructions for assigning a particular set of price memory areas to said display areas.

19. A system according to claim 18, wherein each label includes means for verifying the status of a power supply battery of the label and said particular memory area contains a battery status indicator.

20. A system according to claim 18, wherein said particular memory area is an address area of the label.

21. A system according to claim 17, wherein the system further includes means for selectively loading a long address or a short address into an address memory of an electronic label.

22. A system according to claim 21, wherein the long address comprises at least a part of the characters of a standardized product code of a product associated with the label and the short address consists at least a part of a particular portion of the characters of the product code and other characters.

* * * * *